United States Patent
Thoma et al.

(10) Patent No.: US 11,125,462 B2
(45) Date of Patent: Sep. 21, 2021

(54) CHANNEL ELEMENT, CHANNEL ELEMENT SYSTEM FOR A VENTILATION SYSTEM, AND BUILDING ENVELOPE EQUIPPED WITH SAID CHANNEL ELEMENT SYSTEM

(71) Applicants: ZEHNDER GROUP INTERNATIONAL AG, Granichen (CH); Flumroc AG, Flums (CH)

(72) Inventors: Urs Thoma, Nafels (CH); Christoph Egli, Lachen (CH)

(73) Assignee: Zehnder Group International AG, Granichen (CH)

( * ) Notice: Subject to any disclaimer, the term of this patent is extended or adjusted under 35 U.S.C. 154(b) by 186 days.

(21) Appl. No.: 16/069,719

(22) PCT Filed: Dec. 22, 2016

(86) PCT No.: PCT/IB2016/057925
§ 371 (c)(1),
(2) Date: Dec. 21, 2018

(87) PCT Pub. No.: WO2017/122068
PCT Pub. Date: Jul. 20, 2017

(65) Prior Publication Data
US 2019/0120519 A1    Apr. 25, 2019

(30) Foreign Application Priority Data
Jan. 12, 2016 (CH) ...................... 0006516

(51) Int. Cl.
*F16L 59/02* (2006.01)
*F24F 13/02* (2006.01)
(Continued)

(52) U.S. Cl.
CPC ........ *F24F 13/0263* (2013.01); *F16L 59/024* (2013.01); *F16L 59/153* (2013.01);
(Continued)

(58) Field of Classification Search
CPC .... F16L 59/024; F16L 59/153; F24F 13/0263
(Continued)

(56) References Cited

U.S. PATENT DOCUMENTS 3,559,694 A * 2/1971 Volberg .................. F16L 59/16
138/147
3,598,157 A * 8/1971 Farr ........................ F16L 59/22
138/157
(Continued)

FOREIGN PATENT DOCUMENTS

DE    202011000304 U1    4/2011
EP    2568208 B1    5/2014
WO    8302491 A1    7/1983

OTHER PUBLICATIONS

International Search Report of PCT/IB2016/057925.

*Primary Examiner* — Patrick F Brinson
(74) *Attorney, Agent, or Firm* — Maxwell L. Minch; Maxwell L Minch Esq. PA

(57) ABSTRACT

The invention relates to a channel element for a ventilation system. The channel element has a first opening (O1), a second opening (O2), and a channel wall which extends between the openings and surrounds a channel section. The channel element has a tubular section (25) and a thermally insulating envelope section (20) which is paired with the tubular section and envelopes same at least in sub-regions. The invention further relates to a channel element system made of individual channel elements which are connected together in series and a building envelope which contains such a channel element system.

19 Claims, 11 Drawing Sheets

Figure 3A:
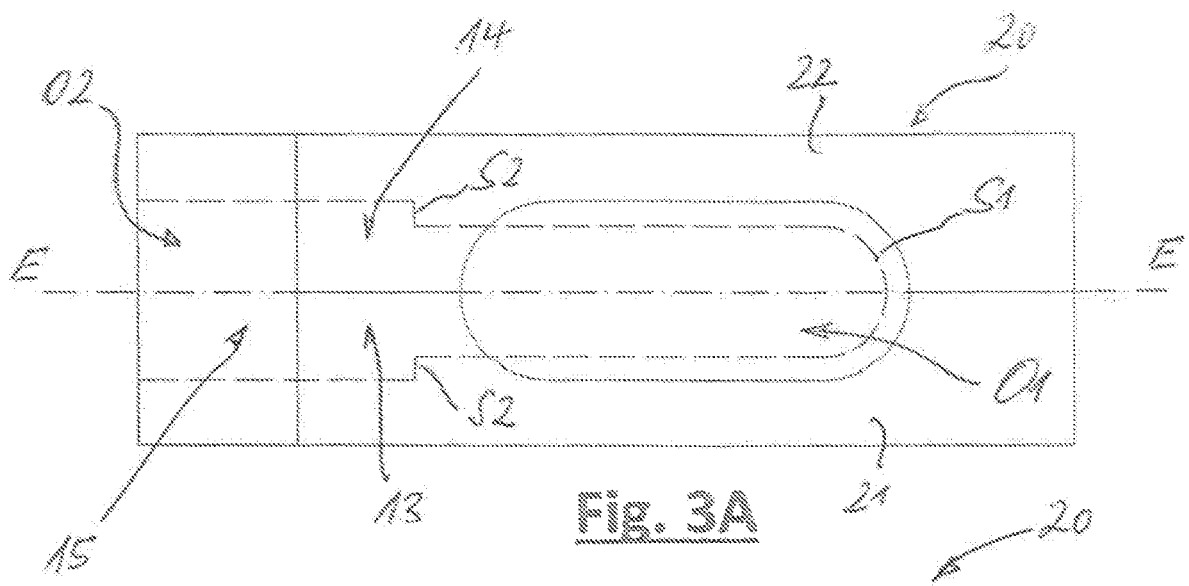

(51) Int. Cl.
*F16L 59/153* (2006.01)
*F16L 59/18* (2006.01)

(52) U.S. Cl.
CPC ........ *F16L 59/182* (2013.01); *F24F 13/0209* (2013.01); *F24F 13/0227* (2013.01); *F24F 13/0245* (2013.01); *F24F 13/0281* (2013.01)

(58) Field of Classification Search
USPC .................. 138/121, 149, 128, 156, 157
See application file for complete search history.

(56) References Cited

U.S. PATENT DOCUMENTS

| | | | | |
|---|---|---|---|---|
| 4,554,721 A | * | 11/1985 | Carty | B65G 53/523 |
| | | | | 138/147 |
| 4,576,206 A | * | 3/1986 | Lauren | B32B 1/08 |
| | | | | 138/149 |
| 5,690,147 A | * | 11/1997 | Cridland | F16L 59/10 |
| | | | | 138/149 |
| 5,975,146 A | * | 11/1999 | Lardillat | F16L 59/147 |
| | | | | 138/149 |
| 6,196,272 B1 | * | 3/2001 | Davis | F16L 59/14 |
| | | | | 138/137 |
| 6,231,704 B1 | | 5/2001 | Carpinetti | |
| 6,403,180 B1 | * | 6/2002 | Barrall | B32B 1/08 |
| | | | | 428/36.5 |
| 2002/0100517 A1 | | 8/2002 | Somerville et al. | |

\* cited by examiner

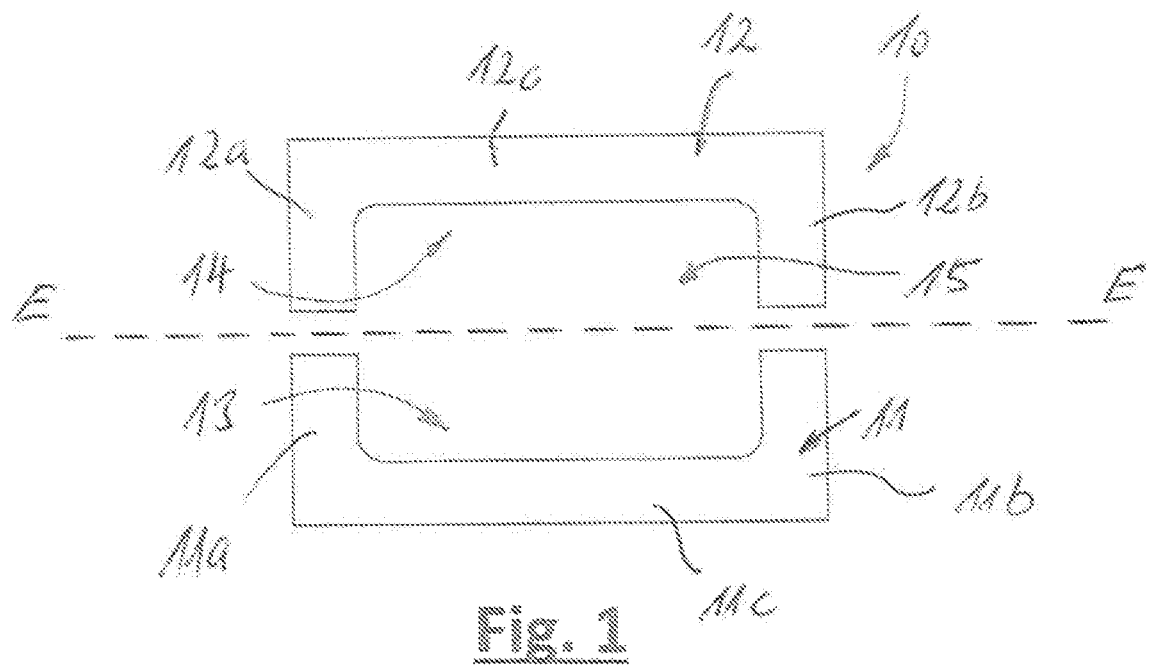

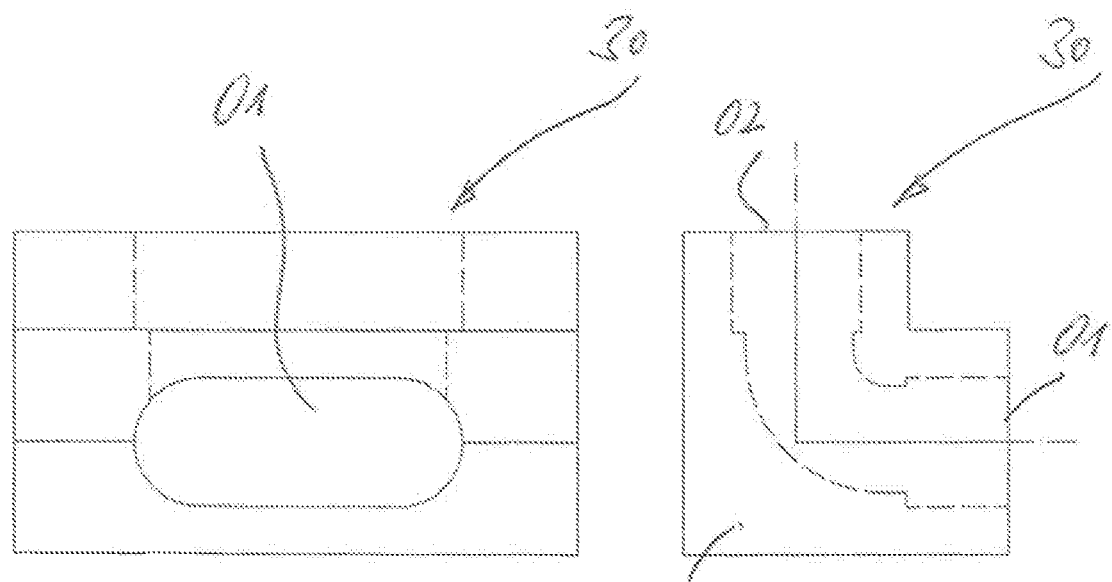
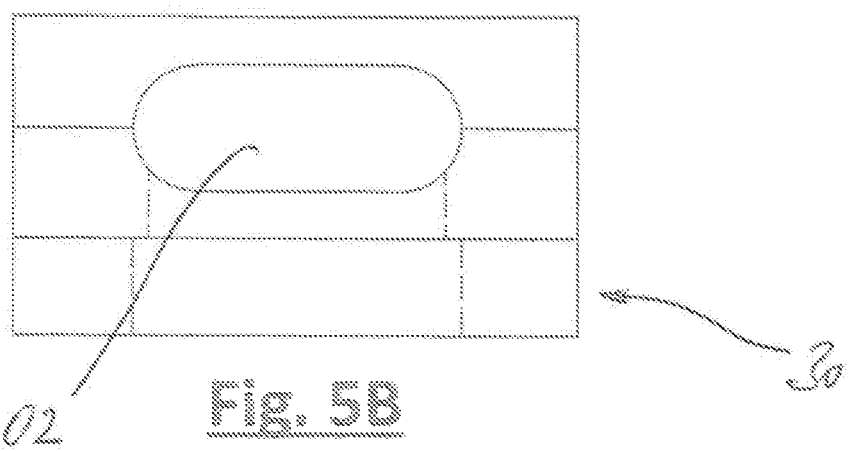
Fig. 5A
Fig. 5C
Fig. 5B

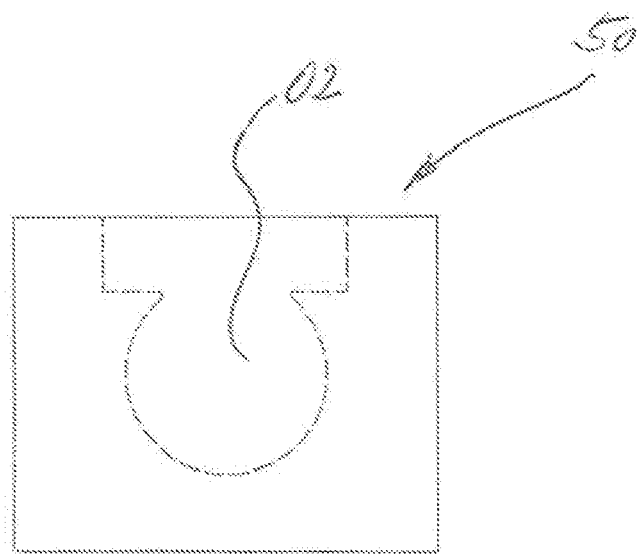
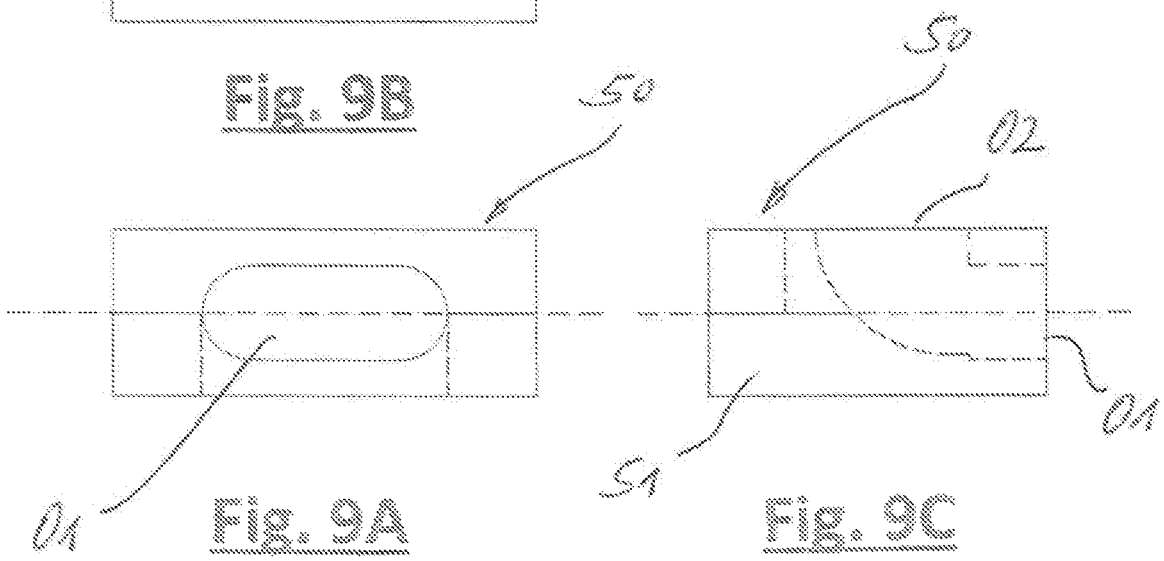
Fig. 9B
Fig. 9A
Fig. 9C

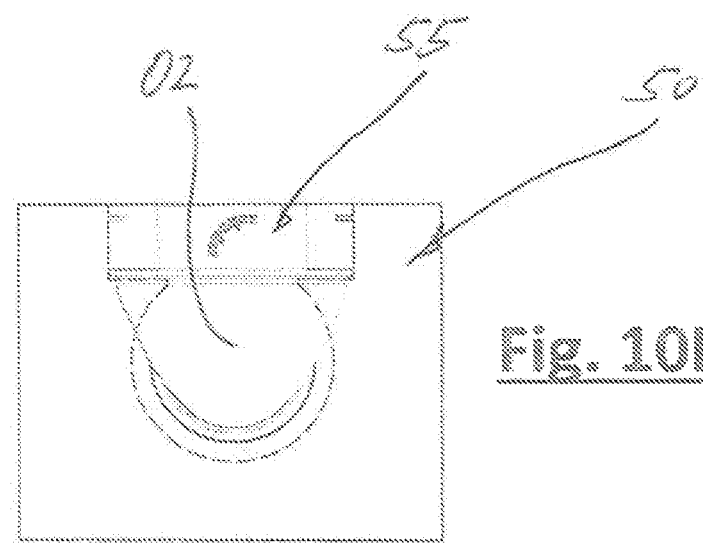
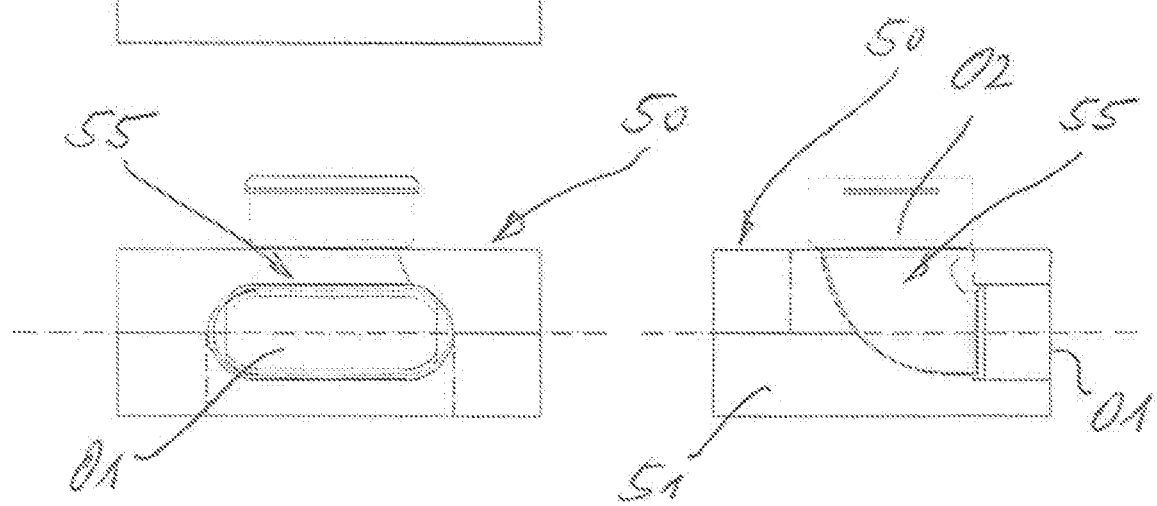
Fig. 10A    Fig. 10B    Fig. 10C

CHANNEL ELEMENT, CHANNEL ELEMENT SYSTEM FOR A VENTILATION SYSTEM, AND BUILDING ENVELOPE EQUIPPED WITH SAID CHANNEL ELEMENT SYSTEM

The invention relates to a channel element, a channel element system for a ventilation system and a building envelope equipped with said channel element system.

Ventilation systems or air distribution systems constructed of channel elements are known. They serve to distribute fresh air supplied to a building from outside into the spaces of the building and to collect air used within the spaces of the building and to discharge it to the outside. The exhausted air has a higher carbon dioxide content than fresh air. The exhausted air often also contains gasses having an unpleasant odor from a variety of sources (e.g. emanations from people, animals, plants or objects, as well as cooking odors) and too much or too little water vapor (too-high or too-low humidity).

By supplying fresh air and dissipating exhausted air, effort is made to ensure an exchange of heat and possibly also an exchange of moisture between the supplied fresh air and the discharged exhausted air, depending upon the climatic situation or the season. For this purpose, centralized or decentralized exchange systems are used, in which heat and, where applicable, also moisture are exchanged between the supplied fresh air and the discharged exhausted air.

A first extreme case is the case of cold and dry outside air, as is often found in the northern hemisphere in winter. In this case, the exchange system transfers the largest possible portion of the heat and moisture contained in the exhausted air to the relatively cool and dry fresh air (heat/humidity recovery)

A second, opposite extreme case is the case of warm and moist outside air, as is often found in the summer in the northern hemisphere or year-round in the tropics. In this case, the exchange system transfers the largest possible portion of the heat and humidity contained in the supplied air to the relatively cool and dry exhaust air (heat/humidity expulsion).

In both centralized and decentralized exchange systems, an effort is made to keep an uncontrolled exchange of heat and/or humidity between the channels of a ventilation system and the area surrounding the channel in question (building inter walls, building outer walls, interior air, exterior air) as low as possible.

Ventilation systems of this type, meaning systems for controlled ventilation, can be integrated into new buildings or installed in existing buildings later. In the case of integration into a new building, the channels can be arranged largely in the interior of the building. In the case of a subsequent installation in existing buildings, the channels are often largely attached to the exterior wall of a building. Even the connecting channels between adjacent spaces are then often routed along the exterior wall of the building. This is then especially advantageous and preferred if, in the course of a subsequent installation of a ventilation system of this type, the building is supplied with a heat-insulating building envelope having a vapor barrier.

The object of the invention is to provide a channel element and a channel element system for a ventilation system that is particularly suited for the subsequent installation of a ventilation system in a building.

To achieve this object, the invention provides a channel element for a ventilation system, wherein the channel element has a first opening, a second opening and a channel wall extending between them that encloses a channel section. According to the invention, the channel element has a tubular section and an envelope section assigned to the tubular section that wraps around it and thermally insulates it at least in sections.

The channel element according to the invention can be assembled together with other channel elements according to the invention having the same or different geometries into a channel of a ventilation system that is heat-insulating with respect to its surrounding area.

For this purpose, the channel element has first formations at its first opening and second formations at its second opening that are complementary to the first formations. Preferably, the first formations and the second formations enable an air-tight latching connection and/or plug-in connection between two channel elements.

Alternately or additionally to the first formation, connection elements can be provided that axially connect the joints between the openings of adjacent channel elements in a tension-proof and air-tight manner.

The tubular section of the channel element is preferably a flexible corrugated tube having a flexible inner skin, which has in particular a water-vapor barrier. In this manner, one and the same tubular section can be used as a straight or curved tubular section.

The corrugated tube and/or the inner skin are preferably formed from a polymer material. Using this, an effective vapor barrier is achieved, whereby an uncontrolled exit of water vapor from a channel section built from such channel elements into its environment can be prevented.

Functionally, the envelope section has a first partial envelope and a second partial envelope that fully surround the tubular section along the circumferential direction of the tubular section. A two-part construction of the envelope section of this type simplifies the application of the envelope section to the tubular section.

Preferably, the first partial shell is a half-shell and the second partial shell is a half-shell that each extend 180° along the circumferential direction of the tubular section. This is particularly advantageous for a straight channel section because, in this case, the first half-shell and the second half-shell have an identical form.

Instead of the two-part formation, the envelope section can be a hose section that can be pulled over the tubular section.

The envelope section preferably contains an inorganic fibrous material, in particular a rock wool or a glass wool. A material of this type insulates well against heat and is fireproof. It is especially preferred in combination with a tubular section made from a polymer material.

In the channel element, the tubular section can have a circular cross-section or a square cross-section. The circular cross-section has the advantage that the tubular section can be bent in every direction, as needed, using the same effort. The square cross-section has the advantage that the tubular section can be bent in four directions orthogonal to each other with the same application of force. In this case, a bending in the four directions that are orthogonal to each other along the corresponding perpendicular bisector of the four sides of the square cross-section is possible using less force than a bending in the four directions that are orthogonal to each other along the two diagonals of the square cross-section.

In an especially advantageous embodiment of the channel element, the tubular section has a tubular-section cross-section having two, in particular only two, axes of symmetry that are orthogonal to each other, in particular a square, oval or elliptical cross-section or a square cross-section having rounded corners or a racetrack-like cross-section having two straight sides that are parallel and opposite each other and two semi-circular sides opposite each other. This allows the provision of a ventilation system, whose channel sections have a low installation height in a direction transverse to the channel longitudinal direction. This is especially advantageous when installing such channel sections in a thin ceiling or in a thin wall, but, above all, in the case of a subsequent installation inside of a building envelope arranged on the outside of a building.

On the one hand, the tubular section and the envelope section can each be a straight section. A straight channel section can thus be obtained.

On the other hand, the tubular section and the envelope section can each be a curved section, whose angle of bending amounts to 45° or 90°, in particular. A correspondingly curved section can thus be obtained.

In the embodiment having a lower installation height, the tubular section and the envelope section can each be a first curved section that is located in a first bending plane that has a first axis of symmetry. In particular, this can be the axis of symmetry running along the longest diameter line of the tubular-section cross-section. If such a curved tubular section of the first type is manufactured by bending a straight, flat tubular section, the bending force to be applied for a bend is equally large in the two directions within the first bending plane.

In the embodiment having a lower installation height, the tubular section and the envelope section can each be a second curved section, that is located in a second bending plane that has a second axis of symmetry. In particular, this can be the axis of symmetry running along the shortest diameter line of the tubular-section cross-section. If such a curved tubular section of the second type is manufactured by bending a straight, flat tubular section, the bending force to be applied for a bend is equally large in the two directions within the second bending plane, but less than the force to be applied for the tubular section of the first type.

Finally, the channel element and the envelope section can each be a transition section, wherein the first opening has a first tubular cross-section, in particular a circular or square cross-section and a second opening has a second tubular cross-section, in particular a rectangular, oval or elliptical cross-section or a square cross-section with rounded corners or a racetrack-like cross-section having two straight sides that are parallel and opposite each other and two semi-circular sides opposite each other. In this manner, a transitional channel element can be obtained.

The invention also provides a channel element system for a ventilation system that is built from individual channel elements arranged in series according to the design described in the previous paragraphs.

The channel element system according to the invention is heat-insulating with respect to its surrounding environment and can be advantageously used for the subsequent installation of a ventilation system, in particular in the interior of a building envelope.

In a first variant, the joints of tubular sections adjacent to each other and the joints of envelope sections adjacent to each other along the channel longitudinal direction are identical, meaning the joints of the tubular sections and the joints of the envelope sections are located along a channel element in the same locations. This has the advantage that previously assembled tubular section/envelope section units can be consecutively connected in series in the construction of a channel region of the channel element system.

In a second variant, the joints of tubular sections adjacent to each other and the joints of envelope sections adjacent to each other are displaced along the channel longitudinal direction. The joints of the tubular sections and the joints of the envelope sections are thus offset by ⅕ to ½ of a channel element length along the channel longitudinal direction. This has the advantage that previously assembled tubular sections and envelope sections along a channel region allow for better air sealing and thus better heat insulation and a better vapor barrier with respect to the area surrounding the channel region.

There are, in turn, two configurations for these two variants or two methods for manufacturing a channel region in an advantageous manner.

In the first configuration of the first method, the individual tubular sections are first assembled into a tube region using joints, and the envelope sections are next attached around the tube region with the appropriate offset along the channel longitudinal direction, wherein each joint of the tube region is bridged by a continuous envelope section.

In the second configuration or the second method, the individual tubular sections and envelope sections are first assembled into the respective tubular section/envelope section units, meaning the respective channel elements. On the side of the first opening, each of these tubular section/envelope section units has only one tubular section region not covered by an envelope region, meaning an open ("naked") tubular-section region and, on the side of the second opening, only one envelope-section region without a tubular-section region inside it, meaning an "empty" envelope-section region. These tubular section/envelope section-unit regions are then assembled.

The invention also provides a building envelope that contains a channel element system according to one of the designs described in the previous paragraphs. When creating the building envelope according to the invention, first half-shells of the envelope sections are preferably first attached to the building wall or to the half-finished building, the appropriate straight or curved tubular sections are next put together inside the half-shells and finally second half-shells are attached to the assembled tubular sections. Afterward, the building envelope is attached or finished.

The building envelope preferably contains a channel region running essentially horizontal, wherein the horizontally running channel region extends in particular along the whole circumference of a footprint of the building. This hinders the spread of a fire in the vertical direction inside a building envelope and is thus an effective contribution to fire protection.

It is especially advantageous if the building is a multi-story building and the channel system has a plurality of channel regions running vertically offset with respect to each other. This a valuable contribution to fire protection.

Figure 3B:
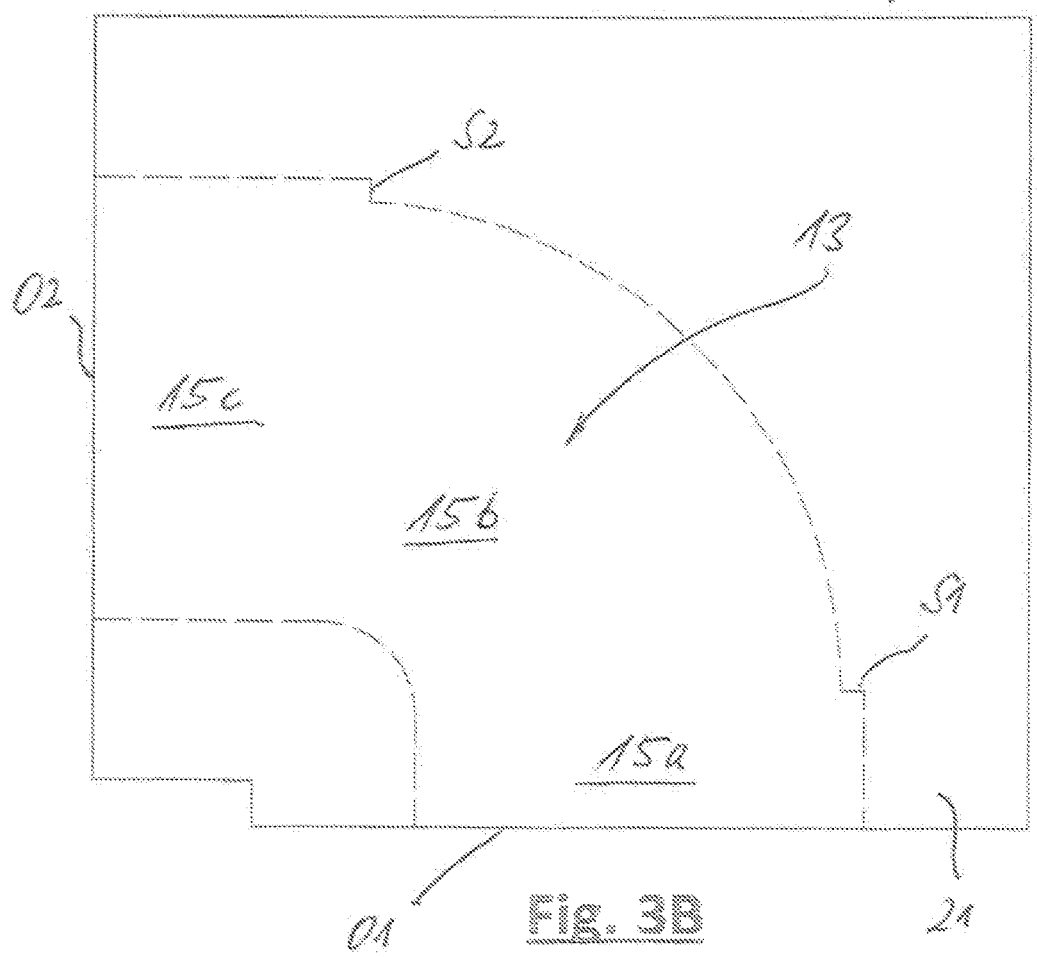
Figure 4A:
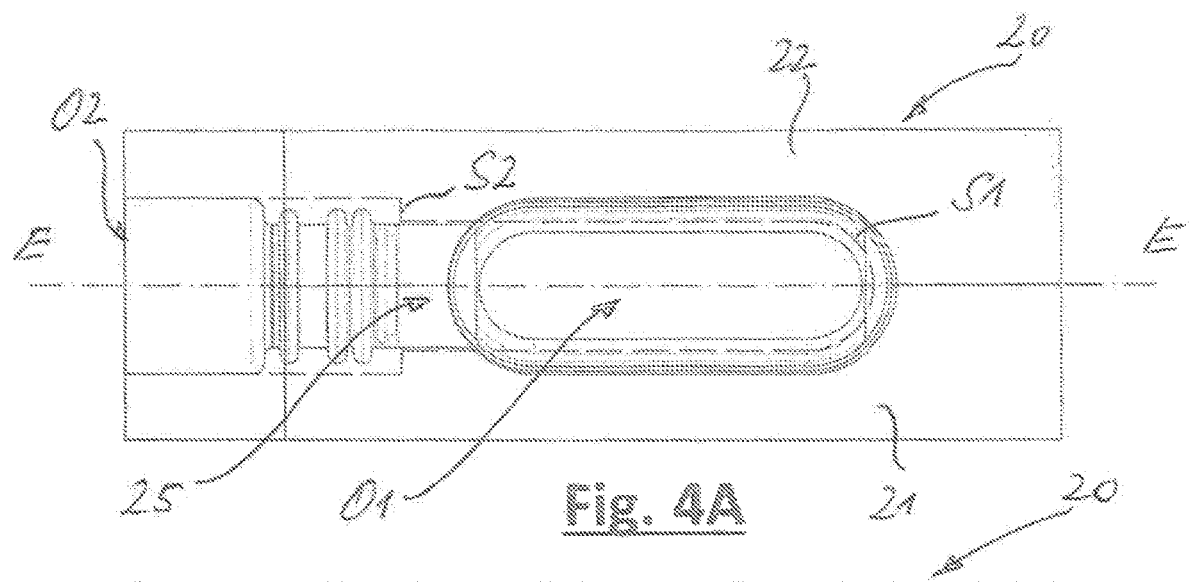
Figure 4B:
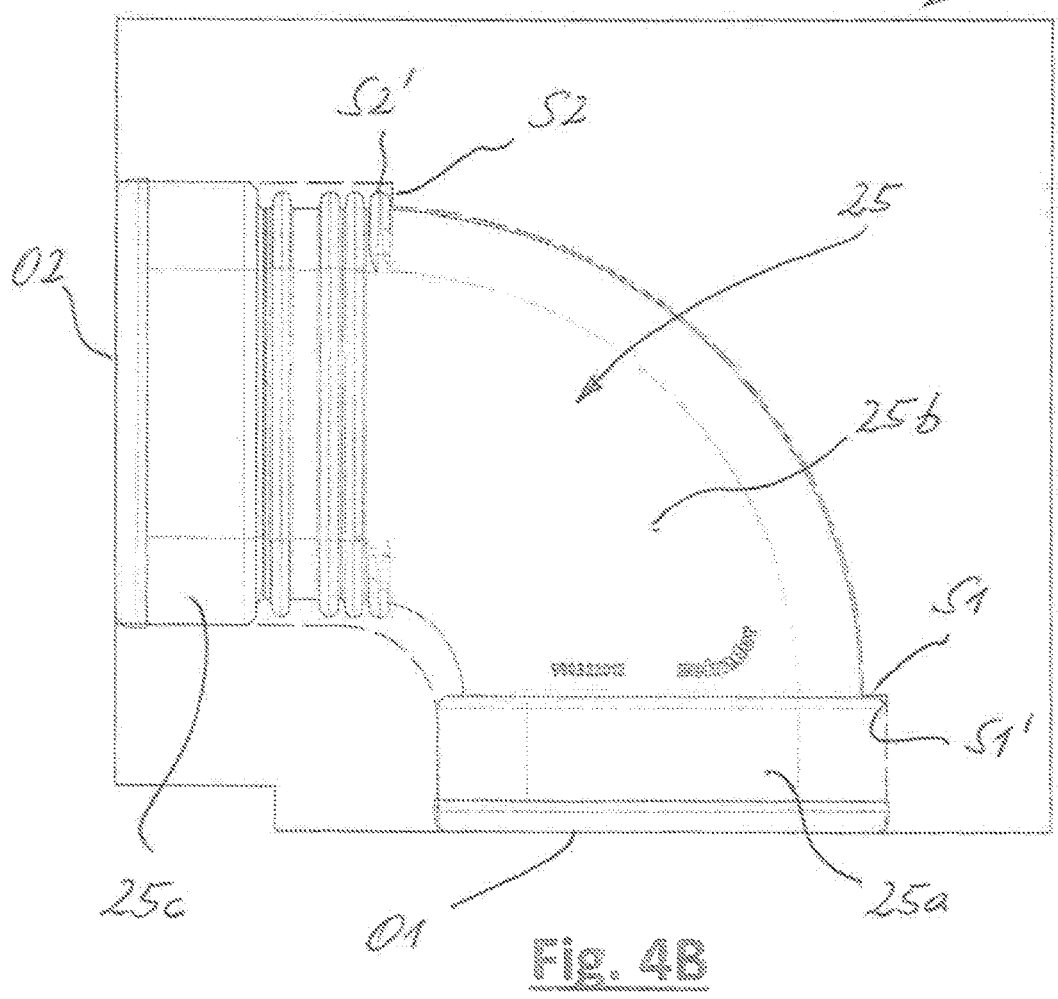
Figure 6A:
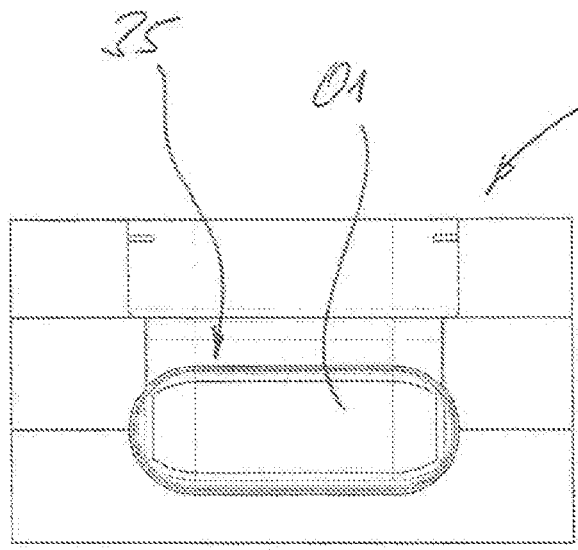
Figure 6C:
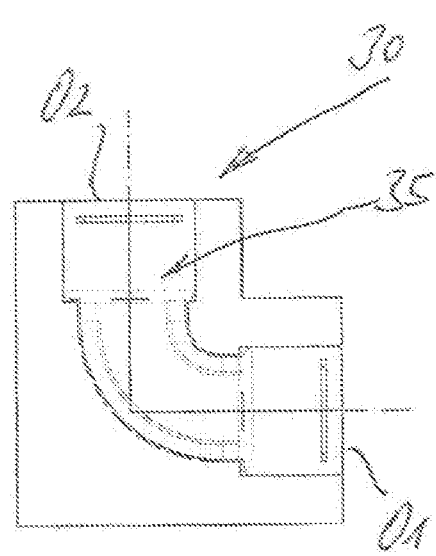
Figure 6B:
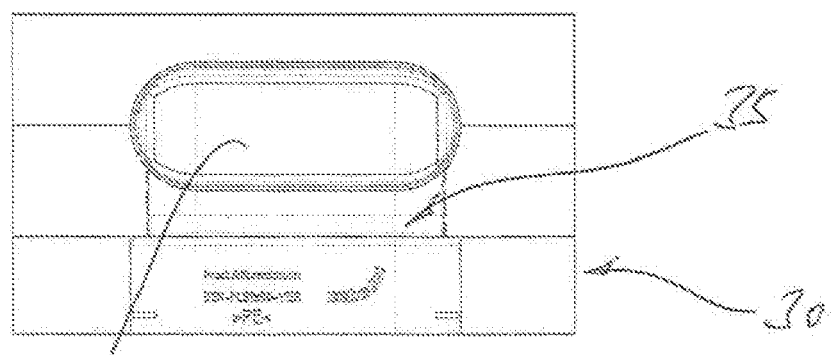
Figure 7A:
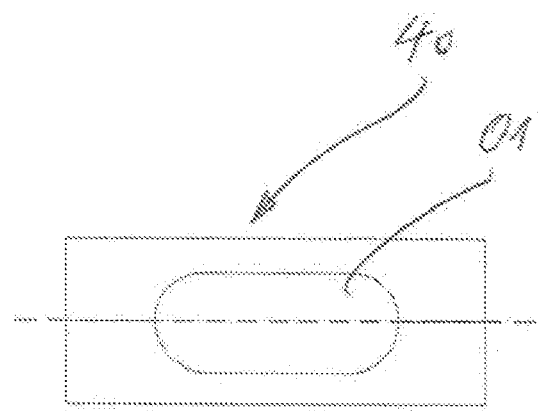
Figure 7C:
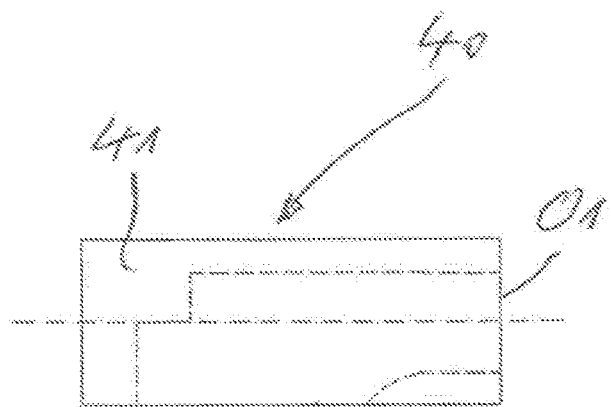
Figure 7B:
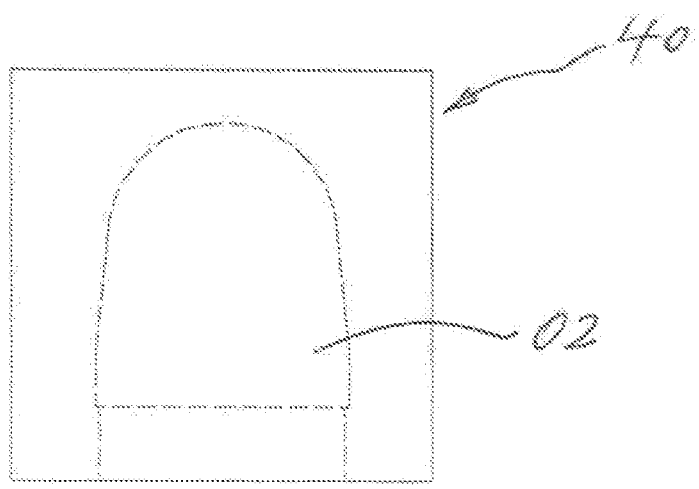
Figures 8A, 8C:
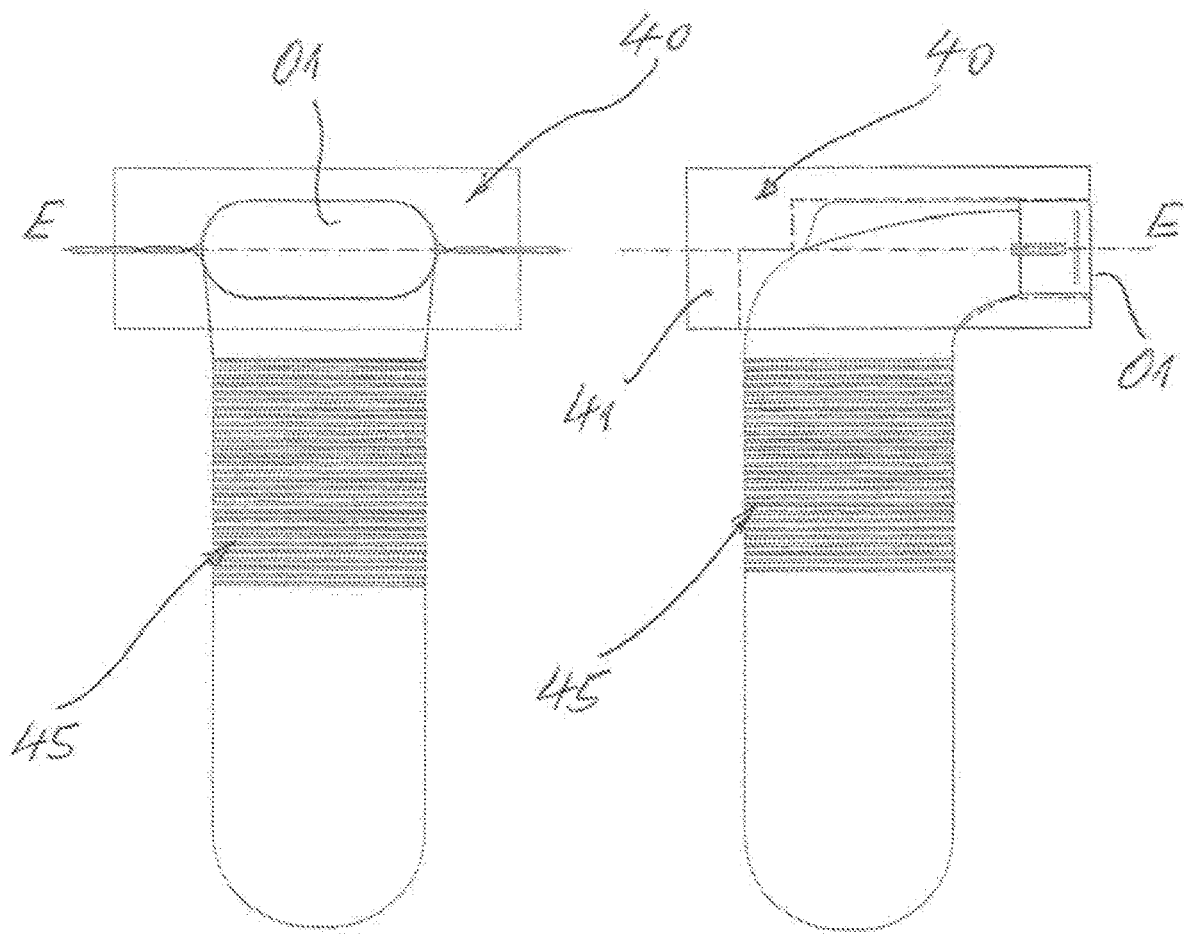
Figure 8B:
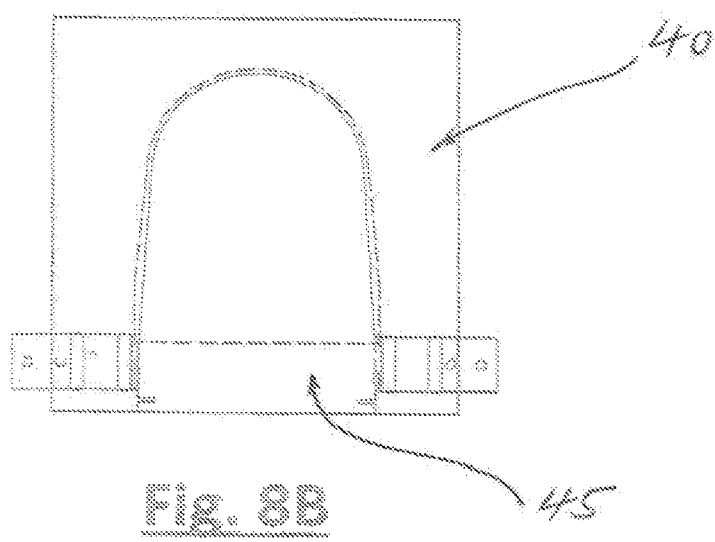
Figure 11A:
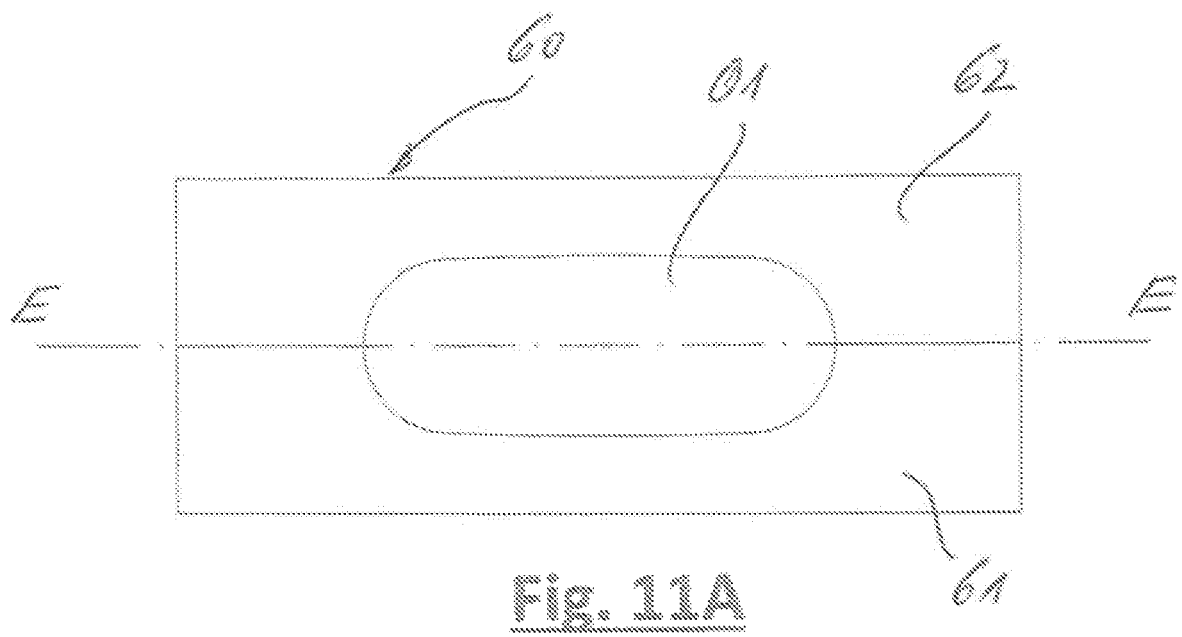
Figure 11B:
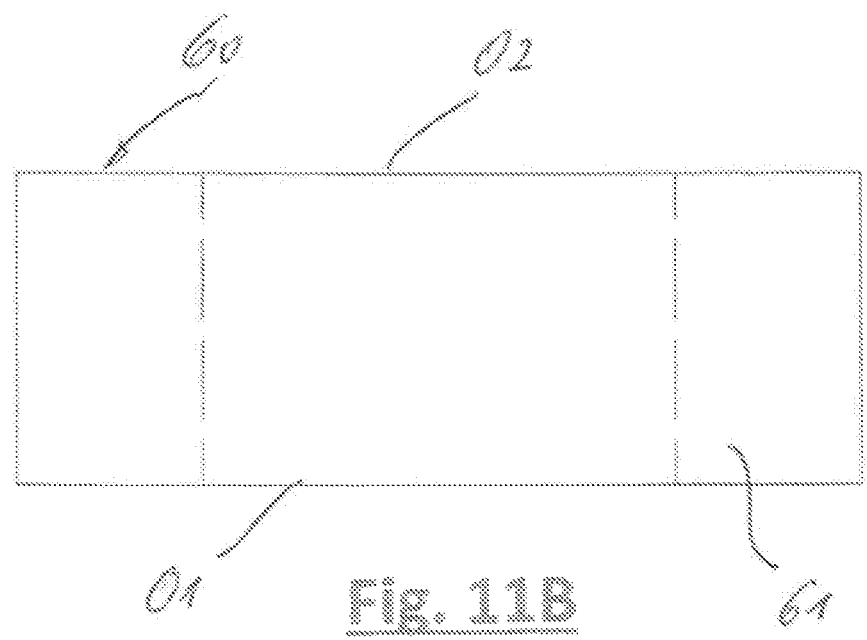
Figure 12A:
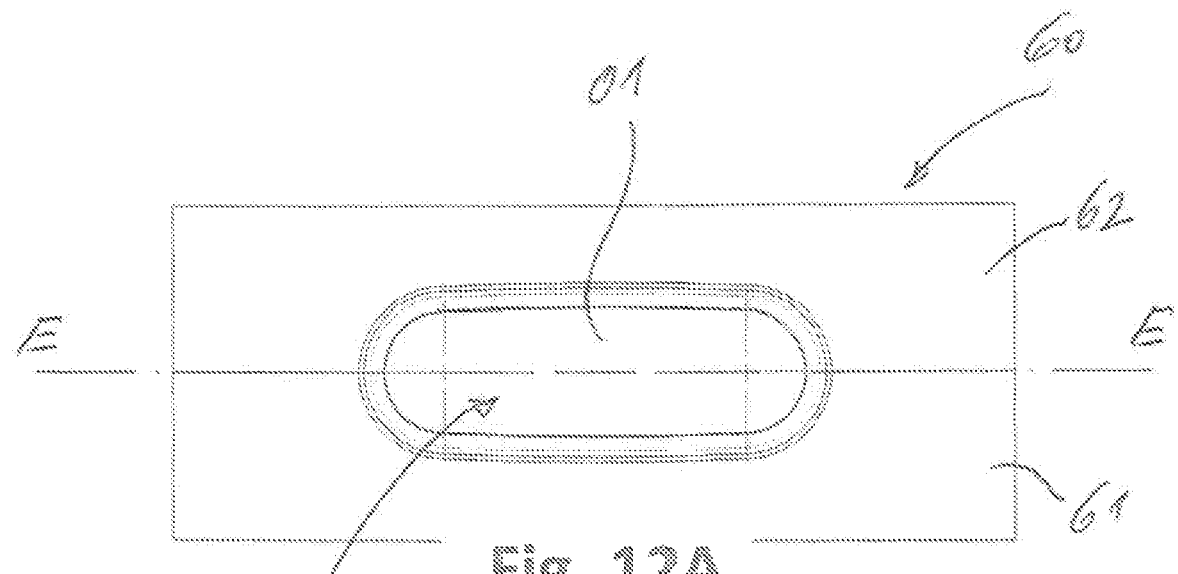
Figure 12B:
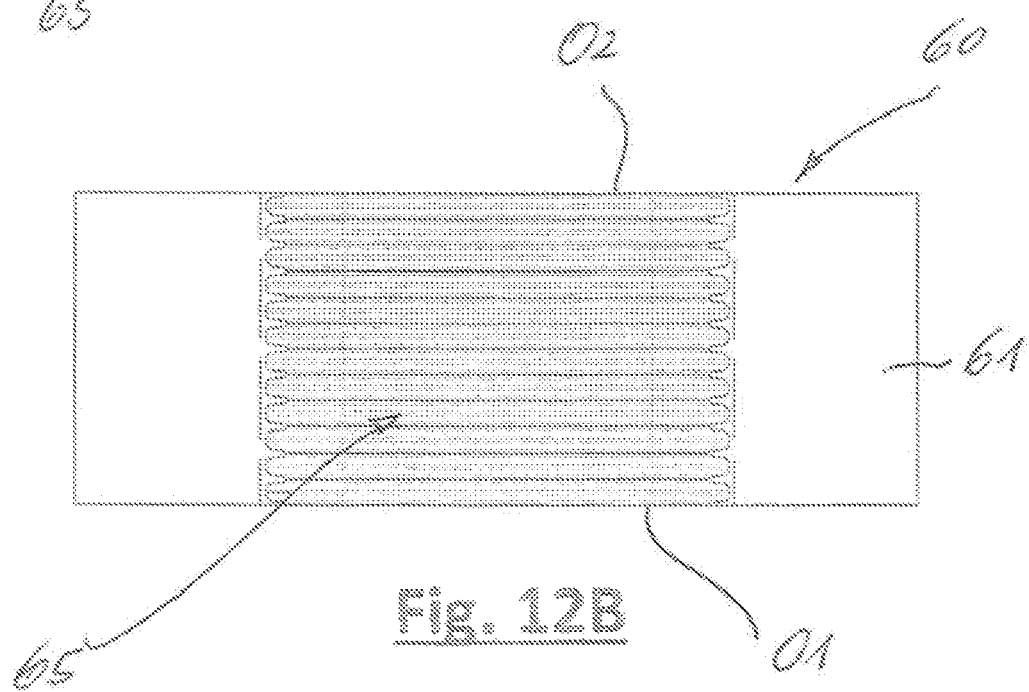

Further advantages, features and application possibilities of the present invention arise from the following description of the exemplary embodiments, which are not to be understood as limiting, in reference to the drawings. Shown are:

FIG. 1 a cross-section through an envelope section of a channel section according to the invention comprising two half-shells;

FIG. 2 a perspective view of an envelope section half-shell of the channel element from FIG. 1;

FIG. 3A a first view of a two-shelled envelope section without a tubular section;

FIG. 3B a top view of the first half-shell of the envelope section from FIG. 3A without a tubular section;

FIG. 4A a side view of the partially cut two-shell envelope section from FIG. 3A having a curved tubular section embedded therein;

FIG. 4B a top view of a first half-shell of the envelope section from FIG. 4A having the curved tubular section embedded therein;

FIG. 5A a first side view with a perspective of a first opening of a two-shelled envelope section without the tubular section;

FIG. 5B a second side view with a perspective of a second opening of a two-shelled envelope section without the tubular section from FIG. 5A without the tubular section;

FIG. 5C a top view of the first half-shell of the envelope section from FIG. 5A or FIG. 5B without the tubular section;

FIG. 6A a first side view with a perspective of the first opening of a two-shelled envelope section without the tubular section from FIG. 5A, FIG. 5B or FIG. 5C having a curved tubular section embedded therein;

FIG. 6B a second side view with a perspective of the second opening of the two-shelled envelope section from FIG. 5A, FIG. 5B or FIG. 5C having the curved tubular section embedded therein;

FIG. 6C a top view of the first half-shell of the envelope section from FIG. 5A, FIG. 5B or FIG. 5C having the curved tubular section embedded therein;

FIG. 7A a first side view with a perspective of the first opening of an additional two-shelled envelope section without the tubular section;

FIG. 7B a second side view with a perspective of the second opening of the two-shelled envelope section from FIG. 7A without the tubular section;

FIG. 7C a top view of the first half-shell of the envelope section from FIG. 7A or FIG. 7B without the tubular section;

FIG. 8A a first side view with a perspective of the first opening of the two-shelled envelope section from FIG. 7A, FIG. 7B or FIG. 7C having a curved tubular section embedded therein;

FIG. 8B a second side view with a perspective of the second opening of the two-shelled envelope section from FIG. 7A, FIG. 7B or FIG. 7C having a curved tubular section embedded therein;

FIG. 8C a top view of the first half-shell of the envelope section from FIG. 7A, FIG. 7B or FIG. 7C having a curved tubular section embedded therein;

FIG. 9A a first side view with a perspective of the first opening of the two-shelled envelope section without the tubular section;

FIG. 9B a second side view with a perspective of the second opening of the two-shelled envelope section from FIG. 9A without the tubular section;

FIG. 9C a top view of the first half-shell of the envelope section from FIG. 9A or FIG. 9B without the tubular section;

FIG. 10A a first side view with a perspective of the first opening of the two-shelled envelope section of FIG. 9A, FIG. 9B or FIG. 9C having a curved tubular section embedded therein;

FIG. 10B a second side view with a perspective of the second opening of the two-shelled envelope section from FIG. 9A, FIG. 9B or FIG. 9C having a curved tubular section embedded therein;

FIG. 10C a first side view with a perspective of the first opening of the two-shelled envelope section from FIG. 9A, FIG. 9B or FIG. 9C having a curved tubular section embedded therein;

FIG. 11A a side view (similar to that in FIG. 1) with a view of an opening of an additional two-shelled envelope section without the tubular section;

FIG. 11B a top view of the first half-shell of the envelope section from FIG. 11A without the tubular section;

FIG. 12A a side view with a perspective of the opening of the two-shelled envelope section from FIG. 11A or FIG. 11B having a straight tubular section embedded therein;

FIG. 12B A top view of the first half-shell of the envelope section from FIG. 11A or FIG. 11B having a straight tubular section embedded therein;

In FIG. 1, there is a cross-section of an envelope section 10 of a channel element according to the invention for a straight tubular section (not shown in FIG. 1). Envelope section 10 contains a first half-shell 11 and a second half-shell 12 that are both identically formed and have the shape of a U-profile or trough-like profile transverse to the envelope-section longitudinal axis (running perpendicular to the drawing plane of FIG. 1) or channel element longitudinal axis, as is shown in FIG. 2. First half-shell 11 contains a first branch 11a, a second branch 11b and a web 11c connecting its first branch 11a to its second branch 11b. Second half-shell 12 contains a first branch 12a, a second branch 12b and a web 12c connecting its first branch 12a to its second branch 12b. The two half-shells 11 and 12 are arranged having their cross-section profiles opposed and symmetrically arranged with respect to a symmetry plane E-E extending between them, so that the two branches 11a and 11b of first half-shell 11 extend in opposite directions from the two branches 12a and 12b of the second half-shell 12.

The two half-shells 11a and 11b, as well as web 11c of first half-shell 11 are adjacent to a first interior space 13. The two branches 12a and 12b, as well as web 12c of second half-shell 12 are adjacent to a second interior space 14. First interior space 13 and second interior space 14 together form a common interior space 15 of envelope section 10. If the two half-shells 11 and 12 are located with the ends of their branches abutting each other, meaning if the ends of the two first branches 11a and 12a abut each other and the ends of the two second branches 11b and 12b abut each other, this interior space 15 corresponds to the space requirement of a tubular section embedded between the two half-shells 11 and 12 (not shown in FIG. 1). Using the U-profile or the trough-like profile, the two half-shells 11 and 12 then engage around the tubular section embedded between them along the compete circumference of the tubular section.

In FIG. 2, a perspective view of first or lower envelope-section half-shell 11 of the channel element from FIG. 1 is shown. First branch 11a, second branch 11b, as well as web 11c of first half-shell 11 that connects these can be recognized. In addition, first interior space 13 defined by first half-shell 11 can be recognized.

In FIG. 3A, a side view of a two-shell envelope section 20 is shown without the tubular section. A first or lower half-shell 21 and a second or upper half-shell 22 can be recognized. The two half-shells 21 and 22 are symmetrical with respect to the symmetrical plane that extends between them. First half-shell 11 defines a first interior space 13 and second half-shell 12 defines a second interior space 14 (indicated by the two dashed lines). First interior space 13 and second interior space 14 together form a common interior space 15 of envelope section 20. Envelope section 20 has a first opening 01 and a second opening 02, between which extends interior space 15 of two-shelled envelope section 20.

In FIG. 3B, a top view of a first half-shell 21 of envelope section 20 from FIG. 3A is shown without the tubular section. The first interior space 13, which is defined by first half-shell 21 and has the form of a curved, open channel with a 90° bend and which extends between first opening 01 and second opening 02, can be recognized. The first interior space 13 of first half-shell 21 together with second half-shell 22 (see FIG. 3A) and its second interior space 14 forms interior space 15 in the shape of a closed channel having a 90° bend that extends between first opening 01 and second opening 02.

Interior space 15 has a first shoulder S1 and a second shoulder S2 along its curved path extending between first opening 01 and second opening 02. Interior space 15 has a first straight channel section 15a between first opening 01 and first shoulder S1, a curved channel section 15b between first shoulder S1 and second shoulder S2 and a second straight channel section 15c between second shoulder S2 and second opening 02.

In FIG. 4A, a side view of partially-cut, two-shelled envelope section 20 from FIG. 3A is shown having a curved tubular section 25 embedded therein. Tubular section 25 is embedded between first half-shell 21 and second half-shell 22 (see FIG. 3A) in interior space 15 and has the shape of a closed channel with a 90° bend that extends between a first opening 01 and a second opening 02 of tubular section 25.

Tubular section 25 has a first shoulder S1' and a second shoulder S2' along its curved path extending between its first opening 01 and its second opening 02. Tubular section 25 has a first straight channel section 25a between its first opening 01 and its first shoulder S1', a curved channel section 25b between first shoulder S1' and its second shoulder S2' and a second straight channel section 25c between its second shoulder S2' and its second opening 02.

In FIG. 4B, a top view of a first half-shell 21 of envelope section 20 from FIG. 4A having the curved tubular section 25 embedded therein is shown.

It can be recognized that tubular section 25 embedded in first half-shell 21 is located with its shoulders S1' and S2' abutting shoulders S1 and S2 of half-shell 21. Tubular section 25 is thus embedded in first half-shell 21 in a positive-locking manner and thereby fixed against displacement or rotation with respect to half-shell 21. Tubular section 25 is also embedded in second half-shell 22 in a positive-locking manner.

In FIGS. 5A to 12B, additional channel elements according to the invention are shown that have envelope sections and tubular sections similar to those in FIGS. 1, 2, 3A, 3B, 4A and 4B. What has been said in the description of these figures is also correspondingly valid for FIGS. 5A to 12B.

In FIG. 5A, a first side view with a perspective of a first opening 01 of a two-shelled envelope section 30 is shown without the tubular section.

In FIG. 5B, a second side view with a perspective of a second opening 02 of a two-shelled envelope section 30 is shown without the tubular section from FIG. 5A.

In FIG. 5C, a top view of a first half-shell 31 of envelope section 30 from FIG. 5A or FIG. 5B is shown without the tubular section.

In FIG. 6A, a first side view with a perspective of first opening 01 of two-shelled envelope section 30 from FIG. 5A, FIG. 5B or FIG. 5C is shown having a curved tubular section 35 embedded therein.

In FIG. 6B, a second side view with a perspective of second opening 02 of two-shelled envelope section 30 from FIG. 5A, FIG. 5B or FIG. 5C is shown having curved tubular section 35 embedded therein.

In FIG. 6C, a top view of first half-shell 31 of envelope section 30 from FIG. 5A, FIG. 5B or FIG. 5C is shown having curved tubular section 35 embedded therein.

In FIG. 7A, a first side view with a perspective of first opening 01 of an additional two-shelled envelope section 40 is shown without the tubular section;

In FIG. 7B, a second side view with a perspective of second opening 02 of two-shelled envelope section 40 from FIG. 7A is shown without the tubular section.

In FIG. 7C, a top view of first half-shell 41 of envelope section 40 from FIG. 7A or FIG. 7B is shown without the tubular section.

In FIG. 8A, a first side view with a perspective of first opening 01 of two-shelled envelope section 40 from FIG. 7A, FIG. 7B or FIG. 7C is shown having a curved tubular section 45 embedded therein.

In FIG. 8B, a second side view with a perspective of second opening 02 of two-shelled envelope section 40 from FIG. 7A, FIG. 7B or FIG. 7C is shown having a curved tubular section 45 embedded therein.

In FIG. 8C, a top view of first half-shell 41 of envelope section 40 from FIG. 7A, FIG. 7B or FIG. 7C is shown having a curved tubular section 45 embedded therein.

In FIG. 9A, a first side view with a perspective of first opening 01 of a further two-shelled envelope section 50 is shown without the tubular section.

In FIG. 9B, a second side view with a perspective of second opening 02 of two-shelled envelope section 50 from FIG. 9A is shown without the tubular section.

In FIG. 9C, a top view of first half-shell 51 of envelope section 50 from FIG. 9A or FIG. 9B is shown without the tubular section.

In FIG. 10A, a first side view with a perspective of first opening 01 of two-shelled envelope section 50 from FIG. 9A, FIG. 9B or FIG. 9C having a curved tubular section 55 embedded therein.

In FIG. 10B, a second side view with a perspective of second opening 02 of two-shelled envelope section 50 from FIG. 9A, FIG. 9B or FIG. 9C is shown having curved tubular section 55 embedded therein.

In FIG. 10C, a top view of first half-shell 51 of envelope section 50 from FIG. 9A, FIG. 9B or FIG. 9C is shown having curved tubular section 55 embedded therein.

In FIG. 11A, a side view (similar to that in FIG. 1) with a perspective of opening 01 of an additional two-shelled envelope section 60 is shown without the tubular section. A lower first half-shell 61 and a second or upper half-shell 62 can be recognized.

In FIG. 11B, a top view of first half-shell 61 of envelope section 60 from FIG. 11A is shown without the tubular section. A lower first half-shell 61 and a second or upper half-shell 62 can again be recognized.

In FIG. 12A, a side view with a perspective of opening of 01 of two-shelled envelope section 60 from FIG. 11A or FIG. 11B is shown having straight tubular section 65 embedded therein. Lower first half-shell 61 and second or upper half-shell 62 can be recognized.

In FIG. 12B, a top view of first half-shell 61 of envelope section 60 from FIG. 11A or FIG. 11B is shown having straight tubular section 65 embedded therein.

The invention claimed is:

1. A channel element for a ventilation system, wherein the channel member has a first opening (O1), a second opening (O2) and a channel wall extending between them enclosing a channel section, wherein the channel element has an envelope section (10; 20; 30; 40; 50; 60) assigned to a tubular section (25; 35; 45; 55; 65) that wraps around said tubular section and thermally insulates said tubular section and wherein said tubular section is a flexible corrugated tube having a flexible inner skin which has a water-vapor barrier.

2. The channel element according to claim 1, wherein said corrugated tube and/or the inner skin is formed from a polymer material.

3. The channel element according to claim 1, wherein the envelope section (10; 20; 30; 40; 50; 60) has a first partial shell (11; 21; 31; 41; 51; 61) and a second partial shell (12; 22; 32; 42; 52; 62) that fully surround said tubular section (25; 35; 45; 55; 65) along the circumferential direction of said tubular section.

4. The channel element according to claim 1, wherein the envelope section has an inorganic fibrous material.

5. The channel element according to claim 1, wherein the tubular section (25; 35; 65) has a tubular-section cross-section with two axes of symmetry orthogonal to each other.

6. The channel element according to claim 1, wherein the tubular section (65) and the envelope section (10; 60) are each a straight section, or the tubular section (25; 35; 45; 55) and the envelope section (20; 30; 40; 50) are each a curved section, whose bending angle amounts to 45° or 90°.

7. The channel element according to claim 5, wherein the tubular section (25) and the envelope section (20) are each a first curved section that is located in a first bending plane that contains a first axis of symmetry, wherein said first axis of symmetry runs along the longest diameter line of the tubular section cross-section, or the tubular section (35) and the envelope section (30) and wherein the first axis of symmetry is a second curved section that is located in a second bending plane that contains a second axis of symmetry running along the shortest diameter line of the tubular section cross-section.

8. The channel element according to claim 1, wherein the tubular section (45; 55) and the envelope section (40; 50) are each a transition section, wherein the first opening (01) has a first tubular cross-section and a second opening (02) has a second tubular cross-section.

9. A channel element system for a ventilation system, wherein said individual channel element system is built from the individual channel elements according to claim 1 arranged in series.

10. The channel element system according to claim 9, wherein the joints of tubular sections adjacent to each other and the joints of envelope sections adjacent to each other are identical along the channel longitudinal direction.

11. The channel element system according to claim 9, wherein the joints of tubular sections adjacent to each other and the joints of envelope sections adjacent to each other are offset along the channel longitudinal direction, wherein the joints of the tubular sections and the joints of the envelope sections are offset wherein said offset is ⅕ to ½ of the length of a channel element along the channel longitudinal direction.

12. A building envelope that contains the channel element system of claim 9.

13. The building envelope according to claim 12, wherein it contains a channel region running essentially horizontal, wherein the horizontally running channel region extends along the whole circumference of a footprint of the building.

14. The building envelope according to claim 12, wherein the building is a multi-story building, wherein the channel system has a plurality of horizontally running channel regions vertically offset to each other.

15. The channel element of claim 4 wherein said inorganic fibrous material is rock wool, glass wool, or combinations thereof.

16. The channel element of claim 5 wherein the two axes of symmetry orthogonal to each other are a square, oval, elliptical cross-section, a square cross-section having rounded corners, a racetrack-like cross-section having two straight sides that are parallel and opposite each other and two semi-circular sides opposite each other, or combinations thereof.

17. The channel element of claim 8 wherein said first tubular cross-section is a circular cross-section, a square cross-section, or combinations thereof.

18. The channel element of claim 8 wherein said second tubular cross-section is rectangular, oval, elliptical cross-section, square cross-section with rounded corners, a racetrack-like cross-section having two straight sides that are parallel and opposite each other and two semi-circular sides opposite each other, or combinations thereof.

19. A channel element for said ventilation system according to claim 1 or 9, wherein said channel member has a first opening (01), a second opening (02) and a channel wall extending between them enclosing a channel section, wherein the channel element has an envelope section (25; 35; 45; 55; 65) assigned to said tubular section (25; 35; 65) that wraps around it and thermally insulates it at least in sections (10; 20; 30; 40; 50; 60);

wherein said tubular section (25; 35; 65) has a tubular-section cross-section with two axes of symmetry orthogonal to each other; and wherein said tubular-section cross-section is square, oval, elliptical, square having rounded corners, racetrack-like having two straight sides that are parallel and opposite each other and two semi-circular sides opposite each other, or combinations thereof.

* * * * *